United States Patent [19]

Smit

[11] Patent Number: 5,029,650

[45] Date of Patent: Jul. 9, 1991

[54] ADJUSTABLE QUICK ATTACHING HITCH COUPLER

[75] Inventor: Edward H. Smit, Sheffield, Iowa

[73] Assignee: Sukup Manufacturing Company, Sheffield, Iowa

[21] Appl. No.: 424,701

[22] Filed: Oct. 20, 1989

[51] Int. Cl.$^5$ ............................................ A01B 63/10
[52] U.S. Cl. ...................................... 172/5; 172/272; 172/439; 172/448
[58] Field of Search ................ 172/5, 6, 26, 272, 439, 172/443, 446–449

[56] References Cited

U.S. PATENT DOCUMENTS

| | | | |
|---|---|---|---|
| 2,608,924 | 9/1952 | Bywater et al. | |
| 2,649,721 | 8/1953 | Spedding | 172/448 |
| 3,034,238 | 5/1962 | McGee | |
| 3,195,651 | 7/1965 | Todd | 172/448 X |
| 3,561,789 | 2/1971 | Strikeleather et al. | |
| 4,019,753 | 4/1977 | Kestel | 172/448 |
| 4,090,725 | 5/1978 | Perin | |
| 4,116,283 | 9/1978 | Blessent | 172/439 X |
| 4,149,736 | 4/1979 | von Allworden | |
| 4,232,878 | 11/1980 | Moore, Jr. | 172/449 |
| 4,236,613 | 12/1980 | van der Lely | |
| 4,475,741 | 10/1984 | Conrad | |
| 4,583,421 | 4/1986 | Rose | |
| 4,640,365 | 2/1987 | Schmidt | 172/26 |
| 4,681,336 | 7/1987 | Kryscyk | |
| 4,738,463 | 4/1988 | Poore et al. | |
| 4,930,581 | 6/1990 | Fleischer et al. | 172/6 |

OTHER PUBLICATIONS

Sukup, "Auto Guide", Guidance System Brochures, Sukup Mftg. Co.
"End Cultivator Blight", article, Farm Industry News, Jul. 1989, vol. 22, No. 7, p. 57.
"Machinery Today", article, Farm Journal, Apr. 1989, p. 32.
"Hydraulic 3-Pt. Top Link", article, Darwin Reyne, *Farm Show*, vol. 13, No. 4, Jul. 1989.
Caldwell Automatic Power Hitch advertisement.
ASAE Standard S217.10 Three-Point Free-Link Attachment for Hitching Implements to Agricultural Wheel Tractors.
ASAE Standard S278.6 Attachment of Implements to Agricultural Wheel Tractors Equipped With Quick--Attaching Coupler.
Navigator Row Crop Guidance System advertisement by H. R. Manufacturing Co.
The Guide Quick Hitch advertisement by Lincoln Creek Manufacturing Co., Inc.
Scout Guidance System advertisement by Buffalo Farm Equipment and Fleisher Manufacturing, Inc.
The Guidance System advertisement by Buffalo Farm Equipment and Fleischer Manufacturing, Inc.
Acura Trak Guidance Control advertisement by Sunco Marketing.

*Primary Examiner*—David H. Corbin
*Assistant Examiner*—Jeffrey L. Thompson
*Attorney, Agent, or Firm*—Neuman, Williams, Anderson & Olson

[57] ABSTRACT

A vertical angle adjustable quick-attaching coupler for attaching an implement to the three point hitch of a vehicle. The coupler comprises a coupler frame, attachment means for pivotally mounting the coupler to the three point hitch of the vehicle, hook members for attaching the coupler to the implement, and angle adjustment means which includes a lever arm and a hydraulic cylinder for adjusting the vertical angle of the plane defined by the three attachment points of the three point hitch relative to the plane defined by the hook members of the coupler.

38 Claims, 5 Drawing Sheets

ADJUSTABLE QUICK ATTACHING HITCH COUPLER

BACKGROUND OF THE INVENTION

This invention relates to quick-attaching couplers for three-point hitches on agricultural tractors and more particularly to quick-attaching couplers which include powered adjustment.

A conventional agricultural tractor has a three-point hitch which is designed to connect an implement to the tractor and permit the tractor to raise and lower the implement. With a typical three-point hitch, an implement is supported at three points by a pair of lower links and a central upper link. The lower links are pivotally raised and lowered by lift arms connected to powered shafts at the rear of the tractor. The lower links control the raising and lowering of the implement between its working and transport positions. The central upper link has a forward end which is pivotally connected to the tractor and a rear end which is adapted to be connected to the implement to stabilize the implement in pitch. The central upper link is usually adjustable in length to permit fore and aft pitch adjustment of the attached implement. The central upper link normally includes a turnbuckle to perform manual adjustment of the link.

The length of the upper link is extremely important in certain operations such as cultivating where the cultivator must penetrate the soil at a specified depth in order for the cultivator to perform properly. An operator normally will attach the implement to the three-point hitch and estimate the proper length of the upper arm to obtain effective operation of the implement. The operator then travels across the field a short distance to observe the operation of the implement. If the length of the upper link is incorrect, the operator must stop the tractor, dismount the tractor, manually adjust the length of the upper link, and remount the tractor. This sequence may be repeated several times in order to obtain the correct length for the upper link. Constant dismounting and mounting of the tractor is extremely inconvenient and burdensome. In addition, the soil conditions may vary during the cultivation of a particular field which will affect the performance of the cultivator. Therefore, the operator also may need to adjust the length of the upper link during the cultivating operation.

Quick-attaching couplers have been known to those skilled in the art to eliminate the time consuming process which is required each time the operator wishes to attach a different implement to the tractor. A conventional three-point hitch requires the operator to dismount the tractor and manually attach the two lower links of the three-point hitch to the lower hitch studs of the implement. The operator must also attach the central upper link of the three-point hitch to upper hitch point of the implement by inserting an upper hitch pin. Finally, the operator must insert locking pins into the lower hitch studs and the upper hitch pin. This procedure can be time-consuming and burdensome whenever the operator is attaching an implement.

A quick-attaching coupler can be used to quickly attach implements to the tractor without manual attachment of the lower and upper links of the three-point hitch to the implement. The quick-attaching coupler is essentially a frame which has three hooks extending rearwardly and which is premounted and carried on the outer end of the three-point hitch. The coupler is attached to the three-point hitch in the same manner as an implement would be attached to the three-point hitch. The tractor with the quick-attaching coupler is then connected to the implement. The operator lowers the three-point hitch and positions the hooks on the coupler below the lower hitch studs and the upper hitch pin on the implement. The operator then raises the three-point hitch whereby the hooks on the coupler engage the implement hitching points. Occasionally, the operator must dismount the tractor in order to manually adjust the length of the upper link so that the coupler will engage the upper hitch point.

In order to reduce operator effort and permit adjustment of the hitch during various operations, there have been suggestions to provide a power operated device to adjust the length of the upper link. For example, U.S. Pat. No. 3,561,789 discloses an adjustable length upper link which may be in the form of a hydraulic cylinder or an electric motor configuration. The hydraulic cylinder or electric motor configuration is substituted for the conventional upper link which contains a turnbuckle. However, these designs require the operator to remove the upper link and install the hydraulic or electric adjustable length upper link. When the operator wishes to use the conventional upper link, the operator must remove the hydraulic or electric adjustable length upper link and install the conventional upper link.

One object of this invention is to provide a quick-attaching coupler which has angle adjustment.

Another object of this invention is to provide a quick-attaching coupler which enables the operator to adjust the angle of the implement hitch connection during the tillage operation so that the implement performs effectively.

Another object of this invention is to provide a quick-attaching coupler which enables the operator to adjust the angle of the coupler so that attachment and removal of the implement is less difficult and does not require dismounting the tractor.

Another object of this invention is to provide a quick-attaching coupler with angle adjustment which does not require the removal or replacement of the upper link of the three-point hitch.

Another object of this invention is to provide a quick-attaching coupler with angle adjustment which is rugged in construction, economical to manufacture and efficient in operation.

Other objects and advantages of the invention will become apparent upon reading the following detailed description and appended claims, and upon reference to the accompanying drawings.

SUMMARY OF THE INVENTION

The aforementioned requirements and objects are satisfied through an angle adjustable quick-attaching coupler of this invention. The quick-attaching coupler has a frame which is constructed of upper and lower horizontal frame members and vertical frame members. Hook members are welded to the implement side of the coupler at the lower ends of vertical frame members. The hook members have arcuate recess upper surfaces which receive the lower mounting pins or studs on the implement. Latching members are positioned above the arcuate upper surfaces of the hook members to prevent disengagement of the implement mounting pins or studs from the hook members. An upper hook member is attached to the upper horizontal frame member and has an arcuate recess upper surface which receives the upper mounting pin or stud on the implement.

The quick-attaching coupler is pivotally attached to the upper link and lower links of the three-point hitch. After the operator has attached the quick-attaching coupler to the three point hitch, the operator would position the hook members below the attachment pins or studs on the implement. The operator would then raise the three point hitch and the hook members would engage the studs or pins on the implement.

The quick-attaching coupler includes an angle adjustment lever assembly. The lever assembly is pivotally mounted to the coupler frame. A hydraulic cylinder is attached to one leg of the lever assembly. The operator can adjust the angle of the coupler by operating a lever which will cause the rod in the hydraulic cylinder to extend outwards or to retract inwards toward the cylinder. When the operator causes the rod to extend or retract, the coupler rotates on the lower hitch pins which changes the angle of the plane defined by the mounting points of the coupler relative to the plane defined by the three attachment points of the three point hitch.

This feature is very important because the soil conditions can vary throughout the field and the operator will need to change the angle of the coupler so that the implement performs effectively. With this feature, the operator can change the angle of the coupler during the operation, i.e., on the run, so that the implement performs effectively. In addition, the operator can change the angle of the coupler to facilitate the attachment of the implement to the coupler.

An additional feature of the invention is the hook latching release assembly. The latching member can be held in an open position in order to facilitate the disengagement of the implement. A release rod is pivotally connected to the latching member. The release rod has a groove which engages with a support flange to hold the rod in an upward position. When the rod is held in the upward position, the latch member is held in a rearward position and the mounting stud of the implement can be disengaged from the hook member.

In order to release the latching member to the closed position, the operator releases the rod and the rod moves downward due to the force exerted on the latching member by a spring. When the rod moves downward, the latch member pivots and is positioned above the arcuate hook surface to prevent disengagement of the implement mounting pins from the hook members.

It should be understood that the drawings are not necessarily to scale and that an embodiment is sometimes illustrated in part by schematic and fragmentary views. In certain instances, details of the actual structure which are not necessary for an understanding of the present invention may have been omitted. It should be understood, of course, that the invention is not necessarily limited to the particular embodiments illustrated herein.

DESCRIPTION OF THE PREFERRED EMBODIMENT

Figure 1:
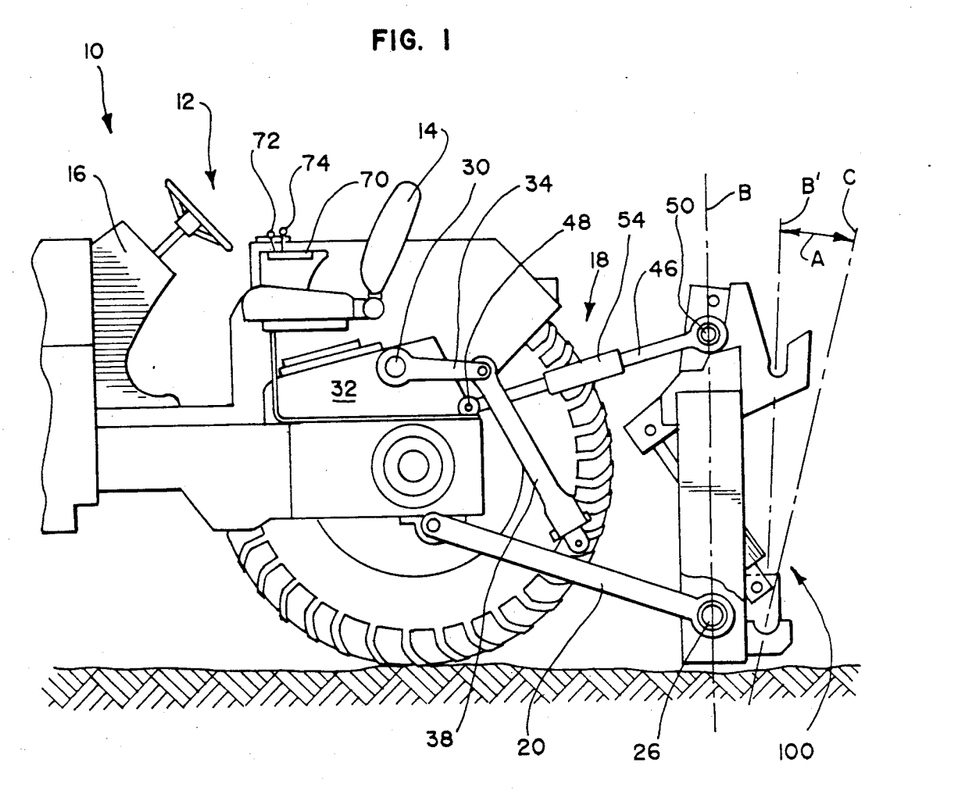
FIG. 1 is a side elevational view of a rearward portion of an agricultural tractor with the left rear wheel and fender removed.
Figure 2:
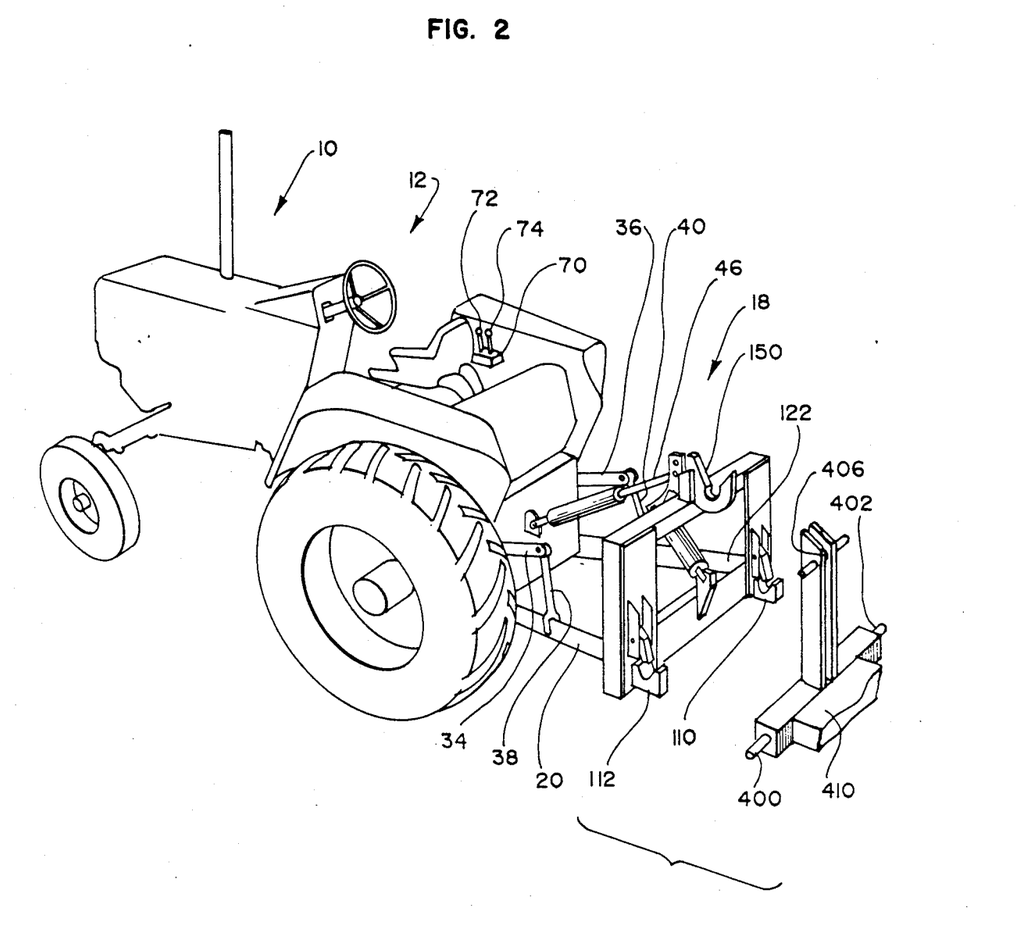
FIG. 2 is a three dimensional view of the tractor with a quick-attaching coupler, which embodies teachings of this invention, connected to the three-point hitch and a fragmentary view of an implement.

Referring to FIGS. 1 and 2, an agricultural tractor is indicated generally by the reference numeral 10. The tractor 10 includes an operator's station 12 which is defined by a seat 14 and a front operating console 16. The near side rear wheel has been removed in FIG. 1 to illustrate various components of the tractor and hitch.

The conventional three-point hitch is indicated generally at 18 and includes a pair of lower lift links 20 and 22 which are pivotally connected to the tractor. The rearward ends of lower links 20 and 22 have ball joints 26, 27 which may receive pins or lower hitch studs of a directly attached implement or, in the illustrated system, of a quick-attaching coupler 100. (See FIG. 4). A lift shaft 30 extends laterally from both sides of the power lift casing 32 and is rotated by a hydraulic drive arrangement (not shown) inside casing 32. Lift arms 34 and 36 are secured to the outer ends of lift shaft 30 for movement in a vertical arc upon rotation of shaft 30. The rearward ends of the lift arms 34 and 36 are pivotally connected to the lower links 20 and 22 by lift links 38 and 40.

The three-point hitch 18 also includes a central upper link 46 which is pivotally connected to the tractor at 48. The rearward end of the upper link 46 has a ball joint 50 which receives a pin from a directly attached implement or, in the illustrated system, a quick-attaching coupler 100. (See FIG. 4). The upper link 46 includes a turnbuckle 54 which is manually rotated to adjust the length of the upper link 46. The length of the upper link determines the vertical angle of the plane B which is created by the mounting points 26, 27 and 50.

As shown in FIGS. 1 and 2, a console 70 is located in the operator's station 12. The console 70 includes levers as at 72 and 74 for operating hydraulic control valves. Lever 72 operates the control valve for controlling the hydraulic cylinder arrangement for the lift shaft 30. By adjusting the lever 72, the operator is able to raise or lower the lower links 20 and 22. Lever 74 operates a control valve for a remote function, in a manner well known to those skilled in the art.

Figures 3, 4, 5:
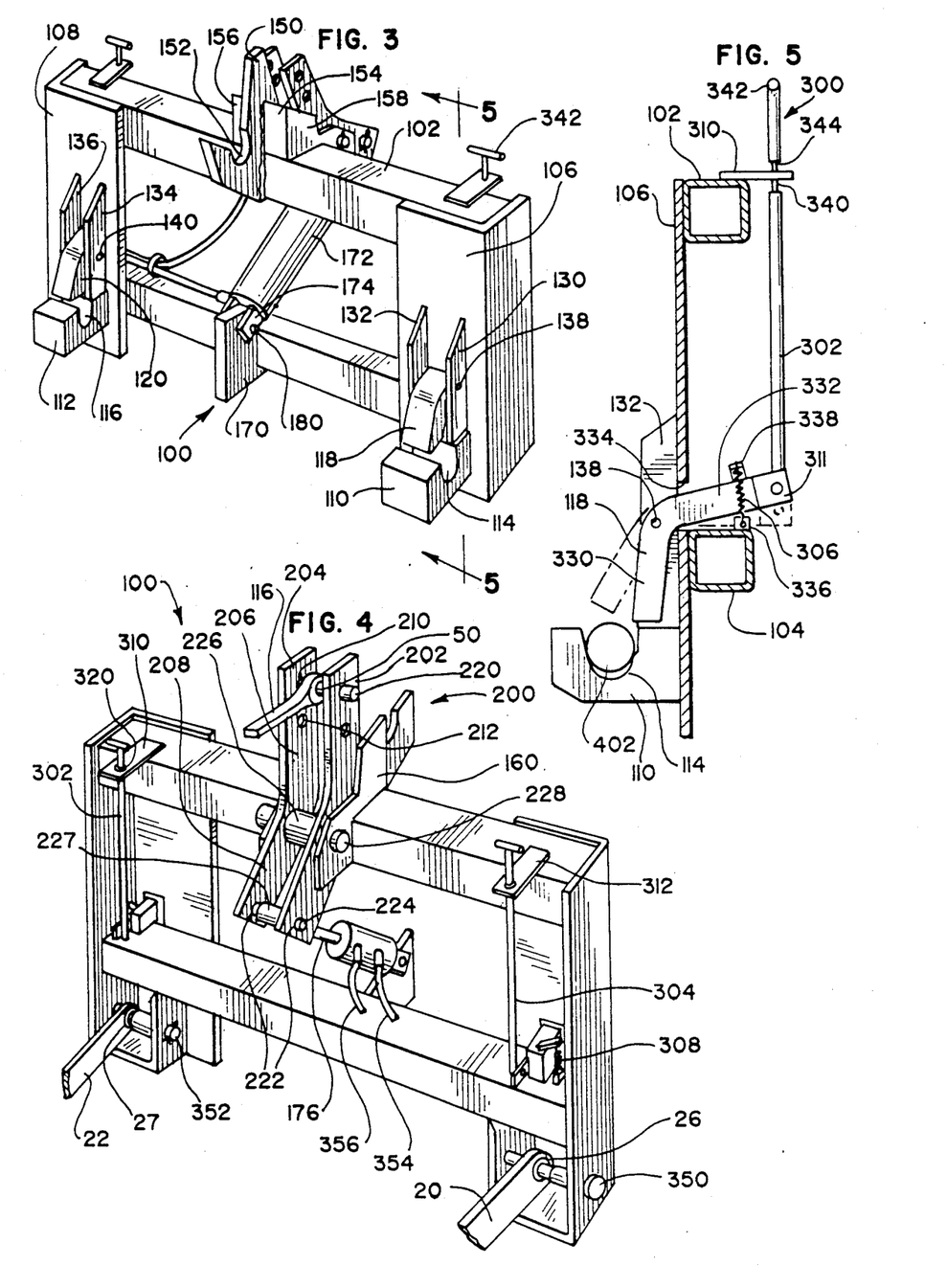
FIG. 3 is a three dimensional view of the implement side of the quick-attaching coupler.
FIG. 4 is a three dimensional view of the tractor side of the quick-attaching coupler.
FIG. 5 is a sectional view of the quick-attaching coupler which shows the latching member and release assembly.

Referring to FIG. 3, reference numeral 100 generally designates a quick-attaching coupler constructed in accordance with the principles of the invention. The coupler 100 has an upper horizontal frame member 102 and a lower horizontal frame member 104. The upper frame member 102 is attached to the upper end of vertical side frame members 106 and 108. The lower frame member 104 is attached slightly below the midpoint of the vertical frame members 106 and 108. By way of example, in the illustrated coupler the upper and lower horizontal frame members 102 and 104 are made from square steel tubing and are welded to the vertical frame members 106 and 108 which are of 90° steel angle stock.

Hook members 110 and 112 are affixed to the implement side of the coupler at the lower ends of vertical frame members 106 and 108, respectively, as by welding. The hook members 110 and 112 have arcuate upper recess surfaces 114 and 116 which receive the lower mounting pins or studs on the implement. Latching members 118 and 120 are located above the arcuate upper surfaces 114 and 116 of the hook members 110 and 112 to prevent disengagement of the mounting pins or studs on the implement from the hook members 110 and 112. The operation of the latching members 118 and 120 is discussed in more detail below.

The latching members 118 and 120 are pivotally attached to latch flanges 130, 132, 134 and 136, as by bolts 138 and 140. Latch flanges 130 and 132 are positioned vertically on each side of latch member 118 and guide the movement of latch member 118 when it pivots on bolt 138. Similarly, latch flanges 134 and 136 are positioned vertically on each side of latch member 120 and guide the movement of latch member 120 when it pivots on bolt 140.

A hook member 150 is affixed to the midpoint of upper horizontal frame member 102, as by welding. Hook member 150 has an arcuate upper recess surface 152 which receives the upper mounting pin or stud on the implement. Vertical support flanges 154 and 156 are similarly affixed to the opposite sides of hook member 150 and to upper frame member 102. The outside ends of support flanges 154 and 156 also are affixed, as by welding, to lever support flanges 158 and 160. The lever support flanges 158 and 160 are positioned transversely to upper frame member 102 and are affixed to the top surface and the forward or tractor side of frame member 102, e.g., by welding.

Figure 7:
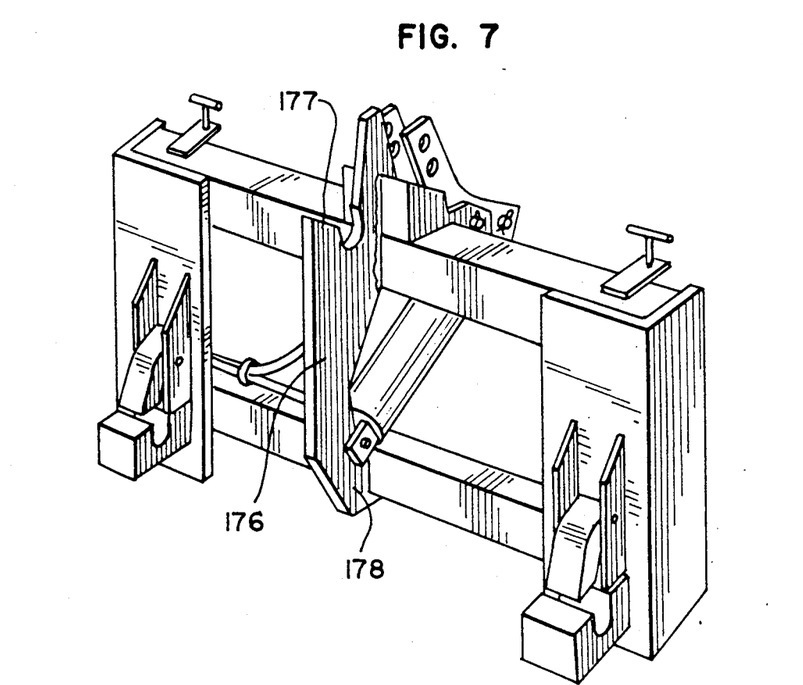
FIG. 7 is a three dimensional view of the implement side of the quick-attaching coupler.

A hydraulic cylinder flange 170 is attached at the midpoint of lower horizontal frame member 104. The cylinder flange 170 pivotally supports a hydraulic cylinder 172 which has a forked end 174 with a bore to receive pivot pin 180 therethrough. As shown in FIG. 7, the quick-attaching coupler could be constructed with a center vertical frame member 176. The vertical frame member 176 has an upper hook portion 177 and a lower portion 178 for mounting the hydraulic cylinder.

The forward side of the quick-attaching coupler 100 is shown in FIG. 4. An adjustment lever assembly 200 includes parallel spaced lever arms 202 and 204 joined by a lever bushing 226. Each of the lever arms has two legs 206 and 208 which form an obtuse included angle. Lever arm legs 206 have two holes 210 and 212 for receiving an upper mounting pin 220. Lever arm legs 208 have holes 222 which receives a hydraulic cylinder mounting pin 224. The lever assembly 200 is pivotally mounted to the lever support flanges 158 and 160 by a pivot pin 228 which extends through bushing 226 and aligned holes through the arms 202 and 204. The rod end of the cylinder is pivotally mounted to the lever assembly 200 by inserting the cylinder pin 224 into the lever arm holes 222 and the cylinder bushing 227.

Figure 6:
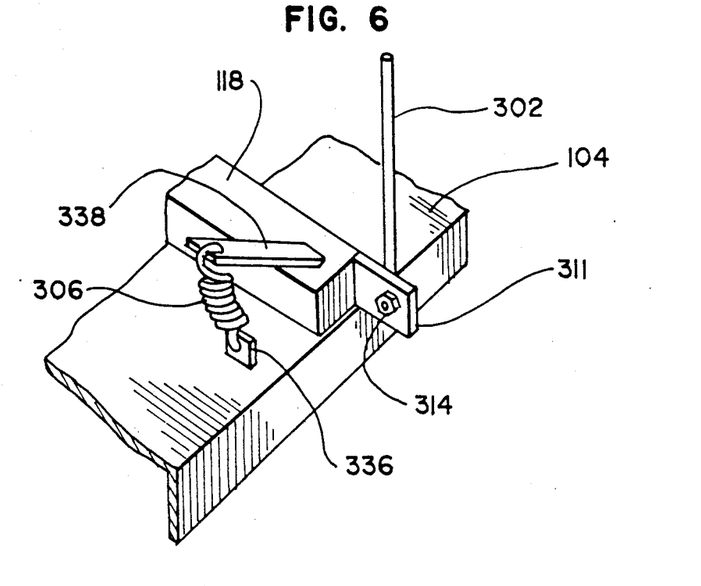
FIG. 6 is a three dimensional view of the latching member and spring assembly.

As shown in FIGS. 3, 5 and 6, the hook latching assembly 300 includes two hook latching members 118 and 120 and related release rods 302 and 304, latch closing springs 306 and 308, and release rod supports 310 and 312. As the two latches are essentially identical, only one will be described in detail. Latching member 118 has legs 330 and 332 which form an obtuse included angle. Leg 330 extends downward and is positioned above the hook 110. Leg 332 extends from the implement side of vertical frame member 106 to the tractor side of frame member 106 via rectangular opening 334. A rod connecting flange 311 is attached to the rearward end of latching member 118.

A latch closing tension spring 306 is attached to lower spring flange 336 which is welded to the lower horizontal frame member 104 near the latch member 118. The upper end of latch closing spring 306 is attached to the upper spring flange 338 which is welded to the side of latch member 118. The closing spring 306 causes the latch member 118 to pivot on pin 138 and move the latch member 118 over the arcuate upper hook surface 114 to prevent disengagement of the mounting pin from the hook member 110.

A rod support flange 310 is attached to upper horizontal frame member 102 and is provided with a guide aperture 320 on the forward or tractor side of frame member 102. The release rod 302 is supported and guided in aperture 320 to permit vertical movement of the release rod. The lower end of release rod 302 is pivotally connected to the lever connecting flange 311, as by a bolt 314. A handle 342 is attached to the upper end of release rod 302.

Each latching member can be retained in an open position in order to facilitate the disengagement of the implement. For example, an upper portion of release rod 302 has a different cross-section or groove at 340 where it traverses support 310, e.g. a smaller diameter than the upper and lower portions of rod 302. The aperture 320 in support flange 310 is of appropriate size to admit passage of the larger portion of the rod 302. Thus, the operator may pull upwards on handle 342 until groove 340 is aligned with rod support flange 310. The operator then moves the rod 302 laterally so that the shoulder 344 at the upper end of groove 340 rests upon support flange 310. When the rod 302 is held in this position, latch leg 330 is held in a rearward position and the mounting stud 402 of the implement can be disengaged from the hook member 110.

In order to release the latching member 118 to the closed position, the operator moves the rod 302 laterally until the groove surface 344 is aligned with the larger portion of hole 320. The operator then releases the rod 302 and the rod 302 moves downward due to the force exerted on latching member 118 by spring 306. When the rod 302 moves downward, the latch member 118 pivots on pin 138 and latch member 118 is positioned above the arcuate hook surface 114 to prevent disengagement of the mounting stud from the hook member 110. The spring action positioning of the latches also permits engagement of mounting studs into the supports 110, 112 without presetting to the disengagement position.

Figure 8:
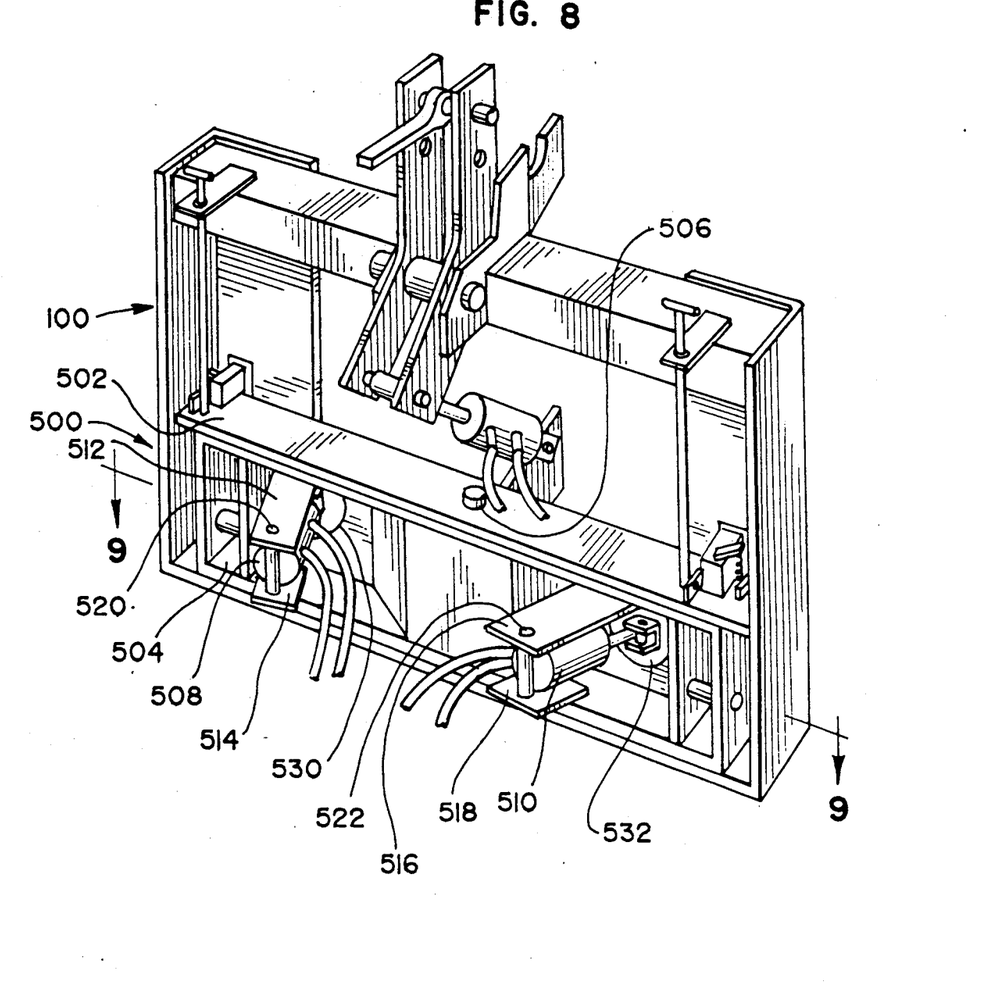
FIG. 8 is a three dimensional view of the tractor side of another embodiment of a quick-attaching coupler which embodies teachings of this invention, including a guidance assembly.
Figure 9:
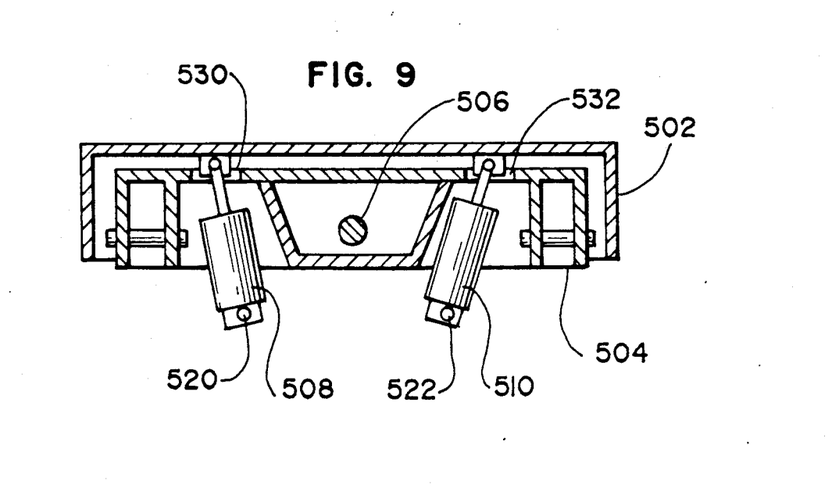
FIG. 9 is a sectional view of the quick-attaching coupler of FIG. 8 which shows the guidance assembly.

Quick-attaching couplers of this invention can also be used with guidance systems. One example of a guidance system includes a sensor which determines the location of the crop row, a control box which processes the information received from the sensor, and a hydraulic guidance assembly which guides the implement by using information from the control box. As shown in FIGS. 8 and 9, the quick-attaching coupler 100 can include a hydraulically driven guidance assembly 500. In this embodiment, the coupler 100 has a lower horizontal frame member 502. An inner frame member 504 is pivotally mounted within the lower horizontal frame member 502 by a vertical pivot pin 506. The inner frame member 504 is able to move within the cavity formed by lower frame member 502. Support flanges 512, 514, 516 and 518 are welded to the inner frame member 504. Hydraulic cylinders 508 and 510 are pivotally attached to these support flanges by pins 520 and 522 respectively. The rod ends of the hydraulic cylinders are projected through the openings 530 and 532 in the inner frame member 504 and are attached to the lower frame member 502.

When the hydraulic cylinders 508 and 510 are operated by the guidance system, the cylinders 508 and 510 are correspondingly extended and retracted. As the cylinders are extended and retracted, the lower frame member 502 pivots on pin 506 and the lateral angle of the lower frame member 502 with respect to the inner frame member 504 changes to shift slightly the position of the attached implement laterally relative to the tractor.

As shown in FIG. 4 (as well as in FIG. 8), the quick-attaching coupler 100 is pivotally attached to the upper link 46 and lower links 20 and 22. The lower links 20 and 22 are attached to the coupler 100 by mounting pins 350 and 352 which are inserted into ball joints 26 and 27. The upper link 46 is attached to the lever assembly 200 by mounting pin 220 which is inserted into ball joint 50. After the mechanical connections have been completed, the hydraulic hoses 354 and 356 are connected to outlets on the tractor which are controlled by the remote function lever 74 on console 70 in the tractor.

With the quick-attaching coupler 100 mounted on the three-point hitch, the operator maneuvers the tractor to align the hook members 110, 112 and 150 with the lower hitch studs 400 and 402 and the upper hitch pin 406 of the implement 410. Referring to FIG. 2, the operator raises or lowers the three-point hitch 18 to position hook members 110 and 112 below hitch studs 400 and 402, as by manipulating lever 72. Similarly, the operator adjusts the angle of the coupler 100 so that hook member 150 is below hitch pin 406, simply by manipulating the hydraulic controls through use of lever 74. The operator then raises the entire hitch assembly, as by using lever 72, and the hook members 110, 112 and 150 thereby engage the studs or pins 400, 402 and 406 on the implement 410. By continued lifting of the three-point hitch 18, the front of the implement is positioned at the proper height for performing the appropriate operation with the implement.

As shown in FIG. 1, plane B is defined by the three attachment points 26, 27 and 50 of the three point hitch 18 to the tractor. Plane B' is substantially parallel to plane B and is defined by the three attachment points 114, 116 and 152 to the implement. These two planes define a variable vertical angle therebetween which is selectively adjustable by the operator through the hydraulic drive and controls to cylinder 172.

Prior to and during use of the implement, often it is desirable to adjust the vertical angle of support of the implement, e.g., to obtain optimum operation. With either of the described units, the operator may effect such adjustment by adjusting the angle of the coupler 100 through the hydraulic control system. That is, by operating lever 74, the rod 176 in hydraulic cylinder 172 will extend outwards or retract inwards toward the cylinder 172 and concomitantly adjust the effective angle of support.

As shown in FIGS. 1 and 4, when the operator causes the rod 176 to extend outwards, the lever arm assembly 200 pivots on pin 228. The coupler 100 rotates on the lower hitch pins 350 and 352 which changes the angle of the quick-attaching coupler 100 relative to the plane B defined by the three attachment points of the three-point hitch 18 on the tractor. Specifically, plane B' is rotated through angle A to a new position C. Consequently, the operator is able to change the effective angle of the support plane defined by the mounting points of the quick-attaching coupler relative to the plane B defined by the three attachment points of the three point hitch. Conversely, when the cylinder rod 176 is retracted inwards, the quick-attaching coupler 100 rotates on the lower hitch pins 350 and 352 which changes the angle of the quick-attaching coupler 100 in the opposite direction. The same result is effected in the embodiment of FIGS. 8 and 9 despite the addition of the system by which the effective implement attachment may also be adjusted laterally.

With this invention, the operator can change the vertical angle of the coupler 100 during the operation, i.e., on the run, so that the implement performs effectively as the soil conditions vary. In addition, the operator can change the angle of the coupler 100 to facilitate the attachment of the implement to the coupler so that the operator can align the upper hook with the upper implement pin without dismounting the tractor.

While specific embodiments of the invention have been shown and described, it will be understood, of course, that the invention is not limited thereto since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. A hitch coupler for attaching an implement to a hitch system of a vehicle which system has at least two lower links and at least one upper link including three respective distal attachment points for coupling to implements and which three attachment points define a first plane, comprising a coupler frame, implement attachment means supported on said coupler frame for attaching the coupler frame to an implement and defining a second plane, attachment means for mounting the coupler to said attachment points of said hitch system of such a vehicle, and angle adjustment means including a lever arm which is pivotally interconnected between at least one upper link and said implement attachment means, and a remote-control power adjustment means attached to said lever arm for pivoting said arm to vary the vertical angular position of said second plane defined by said implement attachment means of the coupler relative to said first plane defined by said three attachment points of the hitch system for remote power adjustment of the vertical tilt angle of said second plane and of an implement when attached to said implement attachment means.

2. The invention as in claim 1 wherein said power adjustment means is a hydraulic cylinder.

3. The invention as in claim 1 wherein said lever arm is pivotally attached to said at least one upper link of said hitch system and to said coupler frame.

4. The invention as in claim 1 wherein control means for adjusting said power adjustment means is connected to said power adjustment means.

5. The invention as in claim 4 wherein said control means for adjusting said power adjustment means includes controls positioned on the vehicle, whereby the operator does not need to dismount the vehicle to operate the power adjustment means.

6. The invention as in claim 1 wherein said implement attachment means includes latch means to prevent disengagement of the implement from the implement attachment means.

7. The invention as in claim 6 wherein a latch release means is attached to said latch means to permit disengagement of the implement from the implement attachment means.

8. The invention as in claim 1 wherein said implement attachment means are hook members with arcuate upper surfaces to receive mounting pins or studs on the implement.

9. The invention as in claim 8 wherein said implement attachment means includes latch means to prevent disengagement of the implement from the implement attachment means.

10. The invention as in claim 9 wherein a latch release means is attached to said latch means to permit disengagement of the implement from the implement attachment means.

11. The invention as in claim 9 wherein said latch means is a latch member which is pivotally mounted to the coupler frame and is positioned above the arcuate upper surface of the hook member to prevent disengagement of the implement from the hook member.

12. The invention as in claim 11 wherein a latch release means is attached to said latch means to permit disengagement of the implement from the implement attachment means.

13. The invention as claimed in claim 12 wherein said latch release means is a release rod pivotally connected to the latch member and the release rod is held in an upward position.

14. The invention as in claim 13 wherein said release rod has a groove which engages a support flange to hold the release rod in an upward position.

15. The invention in claim 1 wherein said coupler frame includes a guidance assembly means for adjusting the relative lateral angular position between the hitch system of the vehicle and the implement attachment means on the coupler frame.

16. The invention as in claim 15 wherein said guidance assembly means comprises a frame member which is pivotally mounted to said coupler frame and at least one hydraulic cylinder which is attached to said coupler frame and said frame member.

17. A quick-attachment hitch coupler for attaching various implements to a hitch system of a vehicle which system has at lest two lower links and at least one upper link including three respective distal hitch points for coupling to implements and which three hitch points define a first plane, comprising a coupler frame, implement quick-attachment means supported on said coupler frame for selectively attaching the coupler frame to various implements and defining a second plane, attachment means for mounting the coupler to said hitch points of said hitch system of such a vehicle, and remote-control power angle adjustment means comprising at least one member which is pivotally connected between the upper portion of said coupler frame and said hitch point at said at least one upper link of said hitch system and means for adjusting said member for adjusting the vertical angle of said second plane defined by said implement attachment means of the coupler frame relative to said first plane defined by said three hitch points of the hitch system for remote power adjustment of the vertical tilt angle of said second plane and of an implement when attached to said coupler frame.

18. The invention as in claim 17 wherein said member comprises a lever arm which is pivotally mounted to said coupler frame and a power means which is attached to one end of the said lever arm.

19. The invention as in claim 18 wherein said power means is a hydraulic cylinder.

20. The invention as in claim 18 wherein the other end of said lever arm is pivotally attached to said at least one upper link of said hitch system.

21. The invention as in claim 18 wherein control means for adjusting said power means is connected to said power means.

22. An angle adjustment assembly for a hitch coupler which coupler attached an implement to a hitch system of a vehicle, which system has at lest two lower links and at least one upper link including three respective distal attachment points for coupling to implements and which three attachment points define a first plane, and the hitch coupler has implement attachment means for attaching the hitch coupler to an implement comprising a lever arm having means for pivotal interconnection between said at least one upper link and said implement attachment means, and a remote-control power means attached to said lever arm for pivoting said lever arm about said means for pivotal interconnection for thereby adjusting the vertical angle of said second plane defined by said implement attachment means of the coupler relative to said first plane defined by said three attachment points of the hitch system for thereby effecting remote power adjustment of the vertical tilt angle of said second plane and of an implement when attached to said coupler frame.

23. The invention as in claim 22 wherein said power means is a hydraulic cylinder.

24. The invention as in claim 22 wherein said lever arm is pivotally attached to said at least one upper link of said hitch system.

25. The invention as in claim 22 for a hitch coupler which includes a coupler frame on which said implement attachment means are mounted, said lever arm having means for pivotal interconnection to said at least one upper link and to an upper portion of said coupler frame.

26. The invention as in claim 22 wherein control means for adjusting said power means is connected to said power means.

27. The invention as in claim 26 wherein said control means for adjusting said power means includes controls positioned on the vehicle, whereby the operator does not need to dismount the vehicle to operate the angle adjustment means.

28. A quick-attachment hitch coupler for attaching various implements to a hitch system of a vehicle which system has at least two lower links and at least one upper link including three respective distal hitch points for coupling to implements and which three hitch points define a first plane, comprising a coupler frame, implement quick-attachment means supported on said coupler frame for attaching the coupler frame to an implement and defining a second plane, attachment means for mounting the coupler to said hitch points of said hitch system of such a vehicle and including pivotal connections to at least said distal hitch points of said two lower links, and adjustment means for providing controlled adjustment of the angle between said first plane defined by said three hitch points of the hitch system and said second plane defined by said implement attachment means of the coupler by pivoting said coupler frame on said pivotal connections to said two lower links, said adjustment means comprising at least one member which is pivotally connected between said coupler frame and said distal hitch point of said at least one upper link and a means for adjusting said member to vary the distance between the respective connected portions of said coupler frame and said distal hitch points of said at least one upper link.

29. The invention in claim 28 wherein said coupler includes a guidance assembly means for adjusting the relative lateral angular position between the hitch system of the vehicle and the implement attachment means on the coupler frame.

30. The invention in claim 29 wherein said guidance assembly means comprises a frame member which is pivotally mounted to said coupler frame and at least one hydraulic cylinder which is attached to said coupler frame and said frame member.

31. The invention as in claim 28 where said member comprises a lever arm pivotally mounted on said coupler frame and a remote-control power means which is attached to said lever arm.

32. The invention as in claim 30, wherein said adjustment means comprises a member having one end pivotally attached to said distal hitch point of said at least one upper link.

33. The invention as in claim 32, wherein the other end of said member is pivotally attached to the upper portion of said coupler frame.

34. A quick-attachment hitch coupler for attaching various implements to a hitch system of a vehicle which system has at least two lower links and at least one upper link including three respective distal attachment points for coupling to implements and which three attachment points define a first plane, comprising a coupler frame, implement quick-attachment means supported on said coupler frame for attaching the coupler frame to an implement and defining a second plane, attachment means for mounting the coupler to said attachment points of said hitch system of such a vehicle and including pivotal connections to at least said distal attachment points of said two lower links, and adjustment means comprising a lever arm which is pivotally interconnected between said hitch coupler frame and said at least one upper link, and a remote control power means which is attached to said lever arm, for adjusting the angle of said first plane defined by said three attachment points of the hitch system relative to said second plane defined by said implement attachment means of the coupler by pivoting said coupler to said pivotal connections to said two lower links.

35. The invention as in claim 34 wherein said power means is a hydraulic cylinder.

36. The invention as in claim 34 wherein said lever arm is pivotally attached to said at least one upper link of said hitch system.

37. The invention as in claim 34 wherein control means for adjusting said power means is connected to said power means.

38. The invention as in claim 37 wherein said control means for adjusting said power means includes controls positioned on the vehicle, whereby the operator does not need to dismount the vehicle to operate the angle adjustment means.

* * * * *

UNITED STATES PATENT AND TRADEMARK OFFICE
CERTIFICATE OF CORRECTION

PATENT NO. : 5,029,650

DATED : July 9, 1991

INVENTOR(S) : Edward H. Smit

It is certified that error appears in the above-identified patent and that said Letters Patent is hereby corrected as shown below:

Col. 9, line 38, delete "claimed"

Col. 10, line 1, "at" should be --of--

Col. 10, line 17, after "said" insert --distal hitch point of said--

Col. 10, line 23, "attached" should be --attaches--

Col. 10, line 29, after "implement" insert -- and defining a second plane, said angle adjustment assembly--

Col. 11, line 19, "points" should be --point--

Col. 11, line 36, "30" should be --28--

Col. 12, line 24, "to" should be --on--

Signed and Sealed this

Fifteenth Day of December, 1992

*Attest:*

DOUGLAS B. COMER

*Attesting Officer*     *Acting Commissioner of Patents and Trademarks*